US012756035B2

(12) United States Patent
Wei

(10) Patent No.: US 12,756,035 B2
(45) Date of Patent: Oct. 6, 2026

(54) TEMPERATURE MANAGEMENT DEVICE AND TEST SYSTEM

(71) Applicant: CONTEMPORARY AMPEREX TECHNOLOGY CO., LIMITED, Ningde (CN)

(72) Inventor: Guojie Wei, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/808,085

(22) Filed: Aug. 19, 2024

(65) Prior Publication Data

US 2024/0413433 A1 Dec. 12, 2024

Related U.S. Application Data

(63) Continuation of application No. PCT/CN2023/075230, filed on Feb. 9, 2023.

(30) Foreign Application Priority Data

Mar. 23, 2022 (CN) ........................ 202210290309.3

(51) Int. Cl.
*H01M 10/6569* (2014.01)
*H01M 10/42* (2006.01)
(Continued)

(52) U.S. Cl.
CPC ... *H01M 10/6569* (2015.04); *H01M 10/4285* (2013.01); *H01M 10/613* (2015.04); *H01M 10/63* (2015.04)

(58) Field of Classification Search
CPC ......... H01M 10/6569; H01M 10/4285; H01M 10/613; H01M 10/42; H01M 10/486;
(Continued)

(56) References Cited

U.S. PATENT DOCUMENTS 5,230,223 A * 7/1993 Hullar ...................... F25B 41/20
62/126
9,564,667 B2 * 2/2017 Iwasa ................ H01M 10/6563
(Continued)

FOREIGN PATENT DOCUMENTS

CA 3092324 A1 * 9/2019 .............. F25B 41/24
CN 205239180 U 5/2016
(Continued)

OTHER PUBLICATIONS

CN111141053A Machine Translation (Year: 2019).*
(Continued)

*Primary Examiner* — Jenna M Maroney
*Assistant Examiner* — Gustavo A Hincapie Serna
(74) *Attorney, Agent, or Firm* — K&L Gates LLP

(57) ABSTRACT

This application discloses a temperature management device and a test system. The temperature management device is configured to perform temperature management on a battery pack cooled by a refrigerant. The temperature management device includes a first port configured to detachably connect to a refrigerant outlet of the battery pack; a second port configured to detachably connect to a refrigerant inlet of the battery pack; a compressor; a condenser; an expansion valve; and a pressure regulating valve, which is configured to regulate pressure of gas discharged from the refrigerant outlet of the battery pack so that a pressure value of gas discharged from the second end of the pressure regulating valve to the inlet of the compressor is within a preset range. The temperature management device and test system of the embodiments of this application can maintain a stable and suitable temperature for the battery pack in a battery pack test.

22 Claims, 2 Drawing Sheets

(51) Int. Cl.
*H01M 10/613* (2014.01)
*H01M 10/63* (2014.01)

(58) Field of Classification Search
CPC ............. H01M 2220/20; H01M 10/48; H01M 10/625; H01M 10/6561; H01M 10/60; H01M 10/637; H01M 10/6567; F25B 2700/1933; F25B 2700/21151; F25B 2700/21173; F25B 41/20; F25B 49/02; F25B 1/00; Y02E 60/10
USPC ........................................................ 62/259.2
See application file for complete search history.

(56) References Cited

U.S. PATENT DOCUMENTS

| | | | | |
|---|---|---|---|---|
| 11,162,388 | B1 * | 11/2021 | Snyder | F25B 25/005 |
| 11,415,345 | B2 * | 8/2022 | Yajima | F25B 49/005 |
| 11,772,449 | B2 * | 10/2023 | Ishizeki | B60H 1/00278 62/259.2 |
| 12,508,868 | B2 * | 12/2025 | Lian | B60H 1/00278 |
| 2006/0162355 | A1 * | 7/2006 | Nakayama | F25B 49/027 62/216 |
| 2008/0282728 | A1 * | 11/2008 | Takegami | F25B 1/10 62/440 |
| 2015/0030902 | A1 * | 1/2015 | Nagano | H01M 10/615 429/120 |
| 2015/0251518 | A1 * | 9/2015 | Nemesh | B60H 1/00899 62/238.7 |
| 2015/0295285 | A1 * | 10/2015 | Takeuchi | B60L 1/02 62/498 |
| 2017/0067672 | A1 * | 3/2017 | Vakiloroaya | F24H 4/02 |
| 2020/0298663 | A1 * | 9/2020 | Allgaeuer | B60H 1/00885 |
| 2021/0086583 | A1 * | 3/2021 | Chatham | B60H 1/00921 |
| 2021/0086585 | A1 * | 3/2021 | Chatham | B60H 1/00885 |
| 2021/0188043 | A1 * | 6/2021 | Smith | B60H 1/3204 |
| 2022/0258570 | A1 * | 8/2022 | Ishizeki | B60H 1/00385 |
| 2022/0278387 | A1 * | 9/2022 | Takata | H01M 50/249 |
| 2022/0293972 | A1 * | 9/2022 | Koti | H01M 8/04029 |
| 2022/0314742 | A1 * | 10/2022 | Miyakoshi | B60H 1/00921 |
| 2023/0137140 | A1 * | 5/2023 | Yamashita | B60H 1/0073 62/244 |
| 2023/0174008 | A1 * | 6/2023 | Lowe | B60H 1/3232 62/236 |
| 2023/0296298 | A1 * | 9/2023 | Yoko | H01M 10/633 62/196.4 |
| 2024/0278619 | A1 * | 8/2024 | Shibaoka | B60H 1/00914 |

FOREIGN PATENT DOCUMENTS

| | | | | | |
|---|---|---|---|---|---|
| CN | 105937810 | A | | 9/2016 | |
| CN | 106440545 | A | | 2/2017 | |
| CN | 208423108 | U | * | 1/2019 | |
| CN | 110071344 | A | | 7/2019 | |
| CN | 110075448 | A | | 8/2019 | |
| CN | 110234944 | A | * | 9/2019 | F25B 49/02 |
| CN | 110849008 | A | * | 2/2020 | F25B 1/005 |
| CN | 111141053 | A | * | 5/2020 | H01M 10/613 |
| CN | 211653087 | U | * | 10/2020 | |
| CN | 212720356 | U | * | 3/2021 | |
| CN | 109841928 | B | * | 5/2021 | |
| CN | 113059980 | A | | 7/2021 | |
| CN | 113571798 | A | * | 10/2021 | H01M 10/617 |
| CN | 114211934 | A | * | 3/2022 | B60H 1/00392 |
| CN | 215983322 | U | * | 3/2022 | |
| DE | 102009033959 | B4 | * | 1/2021 | B60H 1/32281 |
| EP | 3943322 | A2 | * | 1/2022 | B60H 1/00885 |
| EP | 3650261 | B1 | * | 5/2022 | B60K 11/02 |
| JP | 2020128857 | A | | 8/2020 | |
| WO | 2014/129097 | A1 | | 8/2014 | |
| WO | WO-2016072328 | A1 | * | 5/2016 | H01M 50/202 |
| WO | 2019208018 | A1 | | 10/2019 | |
| WO | 2021024776 | A1 | | 2/2021 | |

OTHER PUBLICATIONS

CN110234944A Machine Translation (Year: 2019).*
CN212720356U Machine Translation (Year: 2020).*
CN110849008A Machine Translation (Year: 2019).*
CN211653087U Machine Translation (Year: 2020).*
International Search Report received in the corresponding international application PCT/CN2023/075230, mailed on May 10, 2023.
Written Opinion of ISA received in the corresponding international application PCT/CN2023/075230, mailed on May 10, 2023.
The Decision to Grant a Patent received in the counterpart Japanese Application 2024-514442, mailed on Mar. 11, 2025.
The extended European search report received in the counterpart European Application 23773483.5, mailed on Feb. 27, 2025.
Office Action, mailed Oct. 23, 2025, for corresponding European Patent Application Serial No. 23773483.5.
Office Action (with English Machine Translation), mailed Nov. 12, 2025, for corresponding Korean Patent Application Serial No. 10-2024-7007211.
Office Action (with English Machine Translation), mailed Mar. 23, 2026, for corresponding Chinese Patent Application Serial No. 202210290309.3.
Office Action, mailed Apr. 23, 2026, for corresponding European Patent Application Serial No. 23773483.5.
Notice of Allowance (with English Machine Translation), mailed May 18, 2026, for corresponding Korean Patent Application Serial No. 10-2024-7007211.

* cited by examiner

TEMPERATURE MANAGEMENT DEVICE AND TEST SYSTEM

CROSS-REFERENCE TO RELATED APPLICATIONS

This application is a continuation of International Application No. PCT/CN2023/075230, filed Feb. 9, 2023, which claims priority to Chinese patent application 202210290309.3, filed on Mar. 23, 2022 and entitled "TEMPERATURE MANAGEMENT DEVICE AND TEST SYSTEM", which are incorporated herein by reference in their entireties.

TECHNICAL FIELD

This application relates to the field of batteries and more specifically to a temperature management device and a test system.

BACKGROUND

Energy conservation and emission reduction are crucial to sustainable development of the automobile industry. In this context, electric vehicles, with their advantages in energy conservation and emission reduction, have become an important part of sustainable development of the automobile industry. For electric vehicles, battery technology is an important factor in connection with their development.

In the development of battery technology, in addition to battery performance improvement, safety is another non-negligible issue. Before put into use, batteries undergo a large number of experiments and tests to ensure the safety and performance thereof. Therefore, how a stable temperature environment is provided for battery test is an urgent problem to be solved in the current battery test process.

SUMMARY

Embodiments of this application provide a temperature management device and a test system, which can maintain a stable and suitable temperature for a battery pack in a battery pack test.

According to a first aspect, a temperature management device is provided. The temperature management device is configured to perform temperature management on a battery pack cooled by a refrigerant. The temperature management device includes a first port configured to detachably connect to a refrigerant outlet of the battery pack; a second port configured to detachably connect to a refrigerant inlet of the battery pack; a compressor; a condenser, where an inlet of the condenser is connected to an outlet of the compressor; an expansion valve, where a first inlet of the expansion valve is connected to an outlet of the condenser, and the first outlet of the expansion valve is connected to the second port; a pressure regulating valve, where a first end of the pressure regulating valve is connected to the first port, a second end of the pressure regulating valve is connected to an inlet of the compressor, and the pressure regulating valve is configured to regulate pressure of gas discharged from the refrigerant outlet of the battery pack so that a pressure value of gas discharged from the second end of the pressure regulating valve to the inlet of the compressor is within a preset range; and a monitoring device, where the monitoring device is connected to the first port and/or the second port and configured to monitor a state of the refrigerant at the first port and/or the second port, and the monitoring device includes at least one of a sight glass, a temperature sensor, and a pressure sensor.

Therefore, after the temperature management device in the embodiments of this application is connected to the battery pack, a loop is formed, circularly providing the refrigerant for the battery pack through the compressor, condenser, expansion valve, and pressure regulating valve. The monitoring device can monitor the state of the refrigerant at corresponding positions, for example, can monitor temperature, pressure, and amount of the refrigerant, thereby enabling temperature management for the battery pack connected to the temperature management device. In this way, a relatively stable temperature is maintained for the battery pack, and the temperature management device can be widely used in various test processes for battery packs. Particularly, during charge and discharge of battery packs, a significant amount of heat is generated. As compared with other cooling methods, the temperature of the battery pack drops faster by using the refrigerant in the embodiments of this application.

In some embodiments, the preset range is 300±30 kPa, which can ensure the working efficiency of the compressor and reduce power consumption.

In some embodiments, the temperature management device further includes an adjustment assembly, where the adjustment assembly is configured to connect the inlet of the compressor and the outlet of the condenser, and the adjustment assembly is configured to adjust a proportion of a refrigerant entering the first inlet of the expansion valve to a refrigerant discharged through the outlet of the condenser.

The pressure regulating valve in the embodiments of this application is configured to provide gas with a relatively stable pressure value to the compressor. Therefore, when the pressure of the refrigerant discharged from the battery pack does not fall within the preset range, adjustment can be made through the adjustment assembly.

In some embodiments, the adjustment assembly is configured to increase the proportion of the refrigerant entering the first inlet of the expansion valve to the refrigerant discharged through the outlet of the condenser if pressure of gas at the first end of the pressure regulating valve is higher than the preset range; and/or decrease the proportion of the refrigerant entering the first inlet of the expansion valve to the refrigerant discharged through the outlet of the condenser if pressure of gas at the first end of the pressure regulating valve is lower than the preset range.

This can ensure cooling efficiency of the refrigerant for the battery pack and avoid waste.

In some embodiments, the adjustment assembly is configured to control at least some of the refrigerant discharged through the outlet of the condenser to flow to the inlet of the compressor if the pressure of the gas at the first end of the pressure regulating valve is lower than the preset range, to reduce the refrigerant entering the expansion valve, so as to prevent inadequate utilization of the refrigerant in the battery pack.

In some embodiments, the temperature management device further includes a control unit, where the control unit is configured to control the adjustment assembly based on the pressure of the gas at the first end of the pressure regulating valve. This allows for high regulation efficiency, thereby avoiding waste of power.

In some embodiments, the adjustment assembly includes a capillary tube; and an electromagnetic valve, where an inlet of the electromagnetic valve is connected to the outlet of the condenser, and an outlet of the electromagnetic valve is connected to the inlet of the compressor via the capillary tube. This allows for a simple circuit and easy regulation.

In some embodiments, the monitoring device includes at least one of the following: a first sight glass disposed between the inlet of the compressor and the pressure regulating valve and configured to monitor liquid mixed in gas entering the inlet of the compressor; a first temperature sensor disposed between the pressure regulating valve and the first port and configured to monitor temperature of a refrigerant entering the pressure regulating valve; and a first pressure sensor disposed between the pressure regulating valve and the first port and configured to monitor pressure of the refrigerant entering the pressure regulating valve.

The detected temperature and pressure of the refrigerant discharged from the battery pack may be recorded as data or used for adjusting another component within the temperature management device. For example, when the refrigerant discharged by the battery pack has a pressure value lower than a preset pressure value, it is determined that there is excessive refrigerant inside the battery pack, and therefore, the refrigerant entering the battery pack is reduced.

In some embodiments, the expansion valve is an H-type thermal expansion valve, and the expansion valve further includes a second inlet and a second outlet; the second inlet of the expansion valve is connected to the first port, allowing gas discharged from the refrigerant outlet of the battery pack to be discharged through the second outlet of the expansion valve; and the expansion valve is configured to adjust, based on the gas discharged from the refrigerant outlet of the battery pack, a refrigerant discharged from the first outlet of the expansion valve.

The expansion valve can determine, based on the state such as temperature or pressure of the refrigerant passing through the second inlet and second outlet, whether the refrigerant is fully used in the battery pack, so as to increase or reduce the refrigerant discharged from the first outlet of the expansion valve.

In some embodiments, the temperature management device further includes a liquid storage tank, where an inlet of the liquid storage tank is connected to the outlet of the condenser, and the liquid storage tank is configured to store a refrigerant discharged from the outlet of the condenser; a dry filter, where the dry filter is disposed between an outlet of the liquid storage tank and the first inlet of the expansion valve and configured to filter impurities in a refrigerant discharged from the outlet of the liquid storage tank; and a fan configured to cool the condenser.

When the refrigerant discharged from the condenser does not match the actual demand of the battery pack, especially when there is excessive refrigerant discharged from the condenser, the liquid storage tank stores the refrigerant to prevent refrigerant waste. The dry filter is configured to filter impurities in the refrigerant discharged from the outlet of the liquid storage tank, so as to improve the cooling effect of the refrigerant entering the battery pack. The fan may be configured to cool the condenser to improve the efficiency of the condenser.

In some embodiments, the monitoring device includes at least one of the following: a second sight glass disposed between the dry filter and the first inlet of the expansion valve and configured to monitor a state of a refrigerant entering the first inlet of the expansion valve; a second temperature sensor disposed between the dry filter and the first inlet of the expansion valve and configured to monitor temperature of the refrigerant entering the first inlet of the expansion valve; and a second pressure sensor disposed between the dry filter and the first inlet of the expansion valve and configured to monitor pressure of the refrigerant entering the first inlet of the expansion valve.

The detected temperature and pressure of the refrigerant discharged from the dry filter may be recorded as data or used for adjusting another component within the temperature management device, so as to improve the cooling efficiency for the battery pack.

In some embodiments, the monitoring device further includes a third temperature sensor connected to the battery pack, where the third temperature sensor is configured to monitor internal temperature of the battery pack. When the temperature measured by the third temperature sensor exceeds a required test temperature or the normal temperature of the battery pack, the temperature management device is controlled to be turned on. Conversely, when the measured temperature meets the test requirement or the normal temperature of the battery pack, the temperature management device is controlled to be turned off, avoiding waste.

In some embodiments, the temperature management device further includes a first valve and a second valve, where the first valve is disposed between the outlet of the condenser and the first inlet of the expansion valve, and the second valve is disposed between the first port and the inlet of the compressor; and when the first valve and the second valve are closed, the battery pack is used to replace another battery pack and connected to the temperature management device, so that when the first valve and the second valve are opened again, the temperature management device performs temperature management on the battery pack.

In this way, replacement of the battery pack is implemented through the opening and closing of the first valve and the second valve, without wasting the refrigerant discharged from the condenser or introducing impurities into the compressor. In addition, after the first valve and the second valve are opened again, the temperature management device and the battery pack can form a closed loop, and the internal refrigerant circulates in this loop, improving refrigerant utilization.

In some embodiments, the temperature management device further includes a vacuum assembly, where the vacuum assembly is configured to evacuate the battery pack after the battery pack is connected to the temperature management device and before the first valve and the second valve are opened again, so as to remove excessive gas from the battery pack. Thus, after the first valve and the second valve are opened again, in the process of the temperature management device performing temperature management on the battery pack, only the refrigerant circulates within the closed loop formed by the temperature management device and the battery pack, avoiding the influence of other gases and enhancing the cooling effect of the refrigerant.

According to a second aspect, a test system is provided, including the temperature management device according to the first aspect or any embodiment of the first aspect, and multiple battery packs, where the temperature management device is configured to separately perform, at different times, temperature management for the multiple battery packs cooled by a refrigerant, so as to test the multiple battery packs.

DESCRIPTION OF EMBODIMENTS

Figure 1:
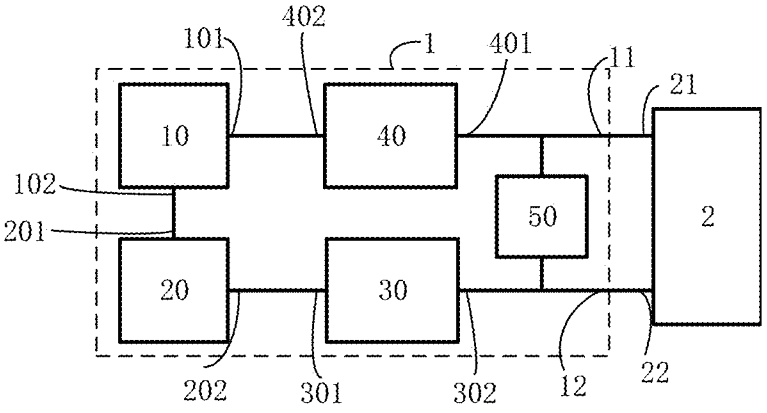
FIG. 1 is a schematic block diagram of a temperature management device according to an embodiment of this application.

The following describes the technical solutions in the embodiments of this application with reference to the accompanying drawings.

To make the objectives, technical solutions, and advantages of the embodiments of this application clearer, the following clearly describes the technical solutions in the embodiments of this application with reference to the accompanying drawings in the embodiments of this application. Apparently, the described embodiments are some rather than all of the embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "have", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments of this application herein may be combined with other embodiments.

In the description of this application, it should be noted that unless otherwise specified and defined explicitly, the terms "mounting", "connection", "join", and "attachment" should be understood in their general senses. For example, they may refer to a fixed connection, a detachable connection, or an integral connection, and may refer to a direct connection, an indirect connection via an intermediate medium, or an internal communication between two elements. Persons of ordinary skills in the art can understand specific meanings of these terms in this application as appropriate to specific situations.

The term "and/or" in this application is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between contextually associated objects.

In the embodiments of this application, the same reference signs denote the same members. For brevity, in different embodiments, detailed descriptions of the same members are not repeated. It should be understood that, as shown in the accompanying drawings, sizes such as thickness, length, and width of various members and sizes such as thickness, length, and width of integrated devices in the embodiments of this application are merely for illustrative purposes and should not constitute any limitations on this application.

In this application, "a plurality of" means more than two (inclusive). Similarly, "a plurality of groups" means more than two (inclusive) groups, and "a plurality of pieces" means more than two (inclusive) pieces.

It should be understood that the battery in the embodiments of this application can be used in various electric devices to provide electrical power to the electric devices. The electric device may be a vehicle, a mobile phone, a portable device, a notebook computer, a ship, a spacecraft, an electric toy, an electric tool, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, an electric toy airplane, and the like. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric device.

The battery may also be called a battery pack. To meet different power usage requirements, the battery may include multiple battery cells, and the multiple battery cells may be connected in series, parallel, or series-parallel, where being connected in series-parallel means a combination of series and parallel connections. In some embodiments, the multiple battery cells may be connected in series, parallel, or series-parallel to form a battery module first, and then a plurality of battery modules are connected in series, parallel, or series-parallel to form the battery. In a word, the multiple battery cells may be directly combined into a battery, or may first be combined into battery modules that are then combined into a battery.

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. battery cells are typically divided into three types by packaging method: cylindrical battery cell, prismatic battery cell, and pouch battery cell. The type of battery is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. A part of positive electrode current collector uncoated with the positive electrode active substance layer protrudes out of a part of positive electrode current collector coated with the positive electrode active substance layer and serves as a positive tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. A part of negative electrode current collector uncoated with the negative electrode active substance layer protrudes out of a part of negative electrode current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and stacked together, and multiple negative tabs are provided and stacked together. The separator may be made of polypropylene (polypropylene, PP), polyethylene (polyethylene, PE), or the like. In addition, the electrode assembly may be a wound structure or a stacked structure. However, the embodiments of this application are not limited thereto.

FIG. 1 is a schematic block diagram of a temperature management device 1 according to an embodiment of this application. The temperature management device 1 in this embodiment of this application is configured to perform temperature management on a battery pack 2 cooled by a refrigerant. As shown in FIG. 1, the temperature management device 1 includes a first port 11 configured to detachably connect to a refrigerant outlet 21 of the battery pack 2; a second port 12 configured to detachably connect to a refrigerant inlet 22 of the battery pack 2; a compressor 10; a condenser 20, where an inlet 201 of the condenser 20 is connected to an outlet 102 of the compressor 10; an expansion valve 30, where a first inlet 301 of the expansion valve 30 is connected to an outlet 202 of the condenser 20, and the first outlet 302 of the expansion valve 30 is connected to the second port 12; a pressure regulating valve 40, where a first end 401 of the pressure regulating valve 40 is connected to the first port 11, a second end 402 of the pressure regulating valve 40 is connected to an inlet 101 of the compressor 10, and the pressure regulating valve 40 is configured to regulate pressure of gas discharged from the refrigerant outlet 21 of the battery pack 2 so that a pressure value of gas discharged from the second end 402 of the pressure regulating valve 40 to the inlet 101 of the compressor 10 is within a preset range; and a monitoring device 50, where the monitoring device 50 is connected to the first port 11 and/or the second port 12 and configured to monitor a state of the refrigerant at the first port 11 and/or the second port 12, and the monitoring device 50 includes at least one of a sight glass, a temperature sensor, and a pressure sensor.

Therefore, after the temperature management device 1 in this embodiment of this application is connected to the battery pack 2, a loop is formed, circularly providing the refrigerant for the battery pack 2 through the compressor 10, condenser 20, expansion valve 30, and pressure regulating valve 40. The monitoring device 50 can monitor the state of the refrigerant at corresponding positions, for example, can monitor temperature, pressure, and amount of the refrigerant, thereby enabling temperature management for the battery pack 2 connected to the temperature management device 1. In this way, a relatively stable temperature is maintained for the battery pack 2, and the temperature management device 1 can be widely used in various test processes for battery packs 2. Particularly, during charge and discharge of battery packs 2, a significant amount of heat is generated. As compared with other cooling methods, temperature of the battery pack 2 drops faster by using the refrigerant in the embodiments of this application.

Figure 2:
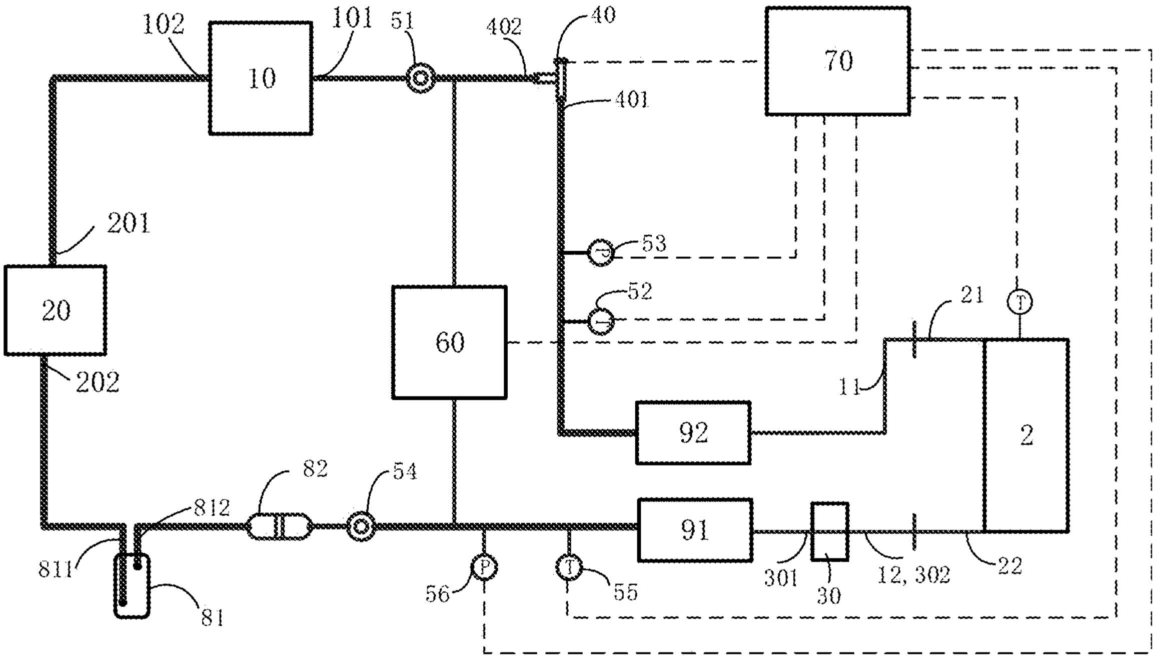
FIG. 2 is a schematic block diagram of a temperature management device connected to a battery pack according to an embodiment of this application.
Figure 3:
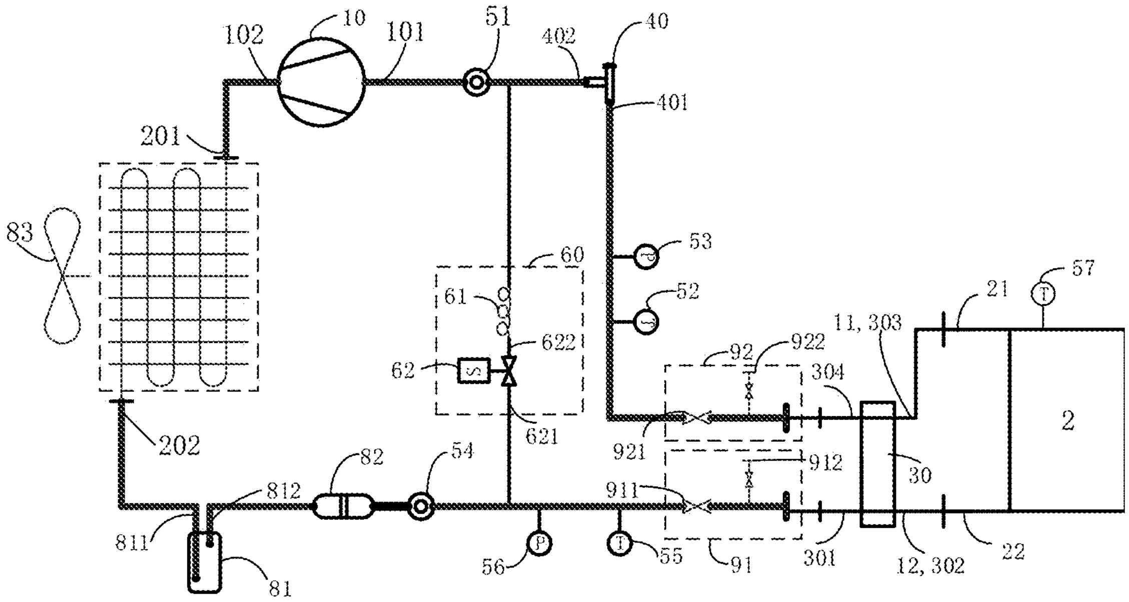
FIG. 3 is another schematic block diagram of a temperature management device connected to a battery pack according to an embodiment of this application.

The following describes the temperature management device 1 in this embodiment of this application in detail with reference to accompanying drawings. FIG. 2 is a schematic block diagram of a temperature management device 1 performing temperature management for a battery pack 2 according to an embodiment of this application. FIG. 3 is another schematic block diagram of a temperature management device 1 performing temperature management for a battery pack 2 according to an embodiment of this application.

It should be understood that in this embodiment of this application, both the first port 22 and the battery pack 2 and the second port 12 and the battery pack 2 are detachably connected, allowing the temperature management device 1 to perform temperature management on different battery packs. For example, the temperature management device 1 may be configured to separately perform, at different times, temperature management for multiple battery packs cooled by a refrigerant, so as to test the multiple battery packs. The temperature management device 1 can be reused, and easy to dismount and mount.

The temperature management device 1 in this embodiment of this application can be used in a test system. The test system includes the temperature management device 1 and multiple battery packs. The temperature management device 1 is configured to separately perform, at different times, temperature management for multiple battery packs cooled by a refrigerant, so as to test the multiple battery packs. Specifically, in this embodiment of this application, the test system including the temperature management device 1 and the multiple battery packs can be used in various test processes. For example, the temperature management device 1 can be used in at least one of the following test processes of the battery pack 2: mud resistance (Mud resistance) test, high-temperature operating endurance test (High Temperature Operating Endurance Test, HTOE), and seasonal test.

For example, in a seasonal test, test conditions may include: the battery pack 2 is placed in an ambient temperature box, where the temperature of the ambient temperature box is kept at a constant temperature of 25° C.; when the surface temperature of battery cells inside the battery pack 2 is higher than or equal to 38° C., the temperature management device 1 needs to be turned on, and when the temperature drops to 35° C., the temperature management device 1 can be turned off; and the test period is 1 year. The temperature of the battery cells can be monitored using a negative temperature coefficient (Negative Temperature Coefficient, NTC) thermistor.

For another example, in an HTOE test, test conditions usually include: the surface temperature (for example, as measured through an NTC test) of the battery cells inside the battery pack 2 needs to be controlled at 50° C.±2° C. for a continuous test period of four months. If the temperature management device 1 is not used and the battery pack 2 is provided with a charge and discharge motor, the NTC detected temperature can reach 58° C., but the maximum temperature of the battery cells cannot exceed 57° C. Therefore, the temperature management device 1 can be turned on at any time after the battery pack 2 exceeds the test temperature, and the temperature management device 1 is turned off when the temperature drops to the required test temperature.

For ease of description, temperature management being performed for any battery pack 2 is used as an example for description in this application. For example, during the test of the battery pack 2, the battery pack 2 needs to be maintained at a preset temperature value. This preset temperature value may be a specific value or a range of values. For example, in the foregoing seasonal test, the preset temperature value may be set to be lower than or equal to 38° C. For another example, the length, width, and height of the battery pack 2 in this embodiment of this application may be 450*650*1200, which are all measured in millimeters (mm), but this embodiment of this application is not limited thereto.

Specifically, as shown in FIGS. 2 and 3, the temperature management device 1 further includes a first valve 91 and a second valve 92. The first valve 91 is disposed between the outlet 202 of the condenser 20 and the first inlet 301 of the expansion valve 30, and the second valve 92 is disposed between the first port 11 and the inlet 101 of the compressor 10. When the first valve 91 and the second valve 92 are closed, the battery pack 2 is used to replace another battery pack and connected to the temperature management device 1. When the first valve 91 and the second valve 92 are opened again, the temperature management device 1 performs temperature management on the battery pack 2. In this way, the opening and closing of the first valve 91 and the second valve 92 can implement change of the battery pack 2 without wasting the refrigerant discharged from the condenser 20 or introducing impurities into the compressor 10. In addition, after the first valve 91 and the second valve 92 are opened again, the temperature management device 1 and the battery pack 2 can form a closed loop, and the internal refrigerant circulates in this loop, improving refrigerant utilization.

Optionally, when the first valve 91 and the second valve 92 are in a closed state, the temperature management device 1 can also be set to a closed state. For example, closing the compressor 10 and/or the condenser 20 can save power and prevent waste.

Specifically, the first valve 91 and the second valve 92 in this embodiment of this application can be implemented in various ways. In addition, the first valve 91 and the second valve 92 can be implemented in the same or different ways. For example, the first valve 91 in this embodiment of this application may include a first manual ball valve 911 and/or a first needle valve 912; and the second valve 92 may include a second manual ball valve 921 and/or a second needle valve 922. As shown in FIGS. 2 and 3, the first valve 91 and the second valve 92 can use a same valve for ease of operation.

For example, as shown in FIGS. 2 and 3, the first valve 91 may include the first manual ball valve 911, and the second valve 92 may include the second manual ball valve 921. After the first manual ball valve 911 and the second manual ball valve 921 are closed, the battery pack 2 may be used to replace another battery pack and then mounted, or the battery pack 2 may be dismounted and replaced with another battery pack. Alternatively, the first valve 91 may further include the first needle valve 912, or the second valve 92 may include the second needle valve 922. In this case, after the first manual ball valve 911 and the second manual ball valve 921 are closed, in the case of dismounting the battery pack 2 and replacing it with another battery pack, the first needle valve 912 or the second needle valve 922 may be connected to a refrigerant recycling machine to recycle the remaining refrigerant inside the battery pack 2. After the recycling, the battery pack 2 is dismounted and replaced with another battery pack. This allows the refrigerant to be recycled for reuse, avoiding refrigerant waste and environmental pollution.

Optionally, the temperature management device 1 in this embodiment of this application may further include a vacuum assembly 75. The vacuum assembly is configured to evacuate the battery pack 2 after the battery pack 2 is connected to the temperature management device 1 and before the first valve 91 and the second valve 92 are opened again. Specifically, as shown in FIGS. 2 and 3, when the first valve 91 and the second valve 92 are in a closed state, to be specific, when the first manual ball valve 911 of the first valve 91 and the second manual ball valve 921 of the second valve 92 are both in a closed state, after the battery pack 2 is connected to the temperature management device 1, the vacuum assembly 75 may be first used to evacuate the battery pack 2 to remove excess gas from the battery pack 2. For example, the vacuum assembly 75 may be connected to the first needle valve 912 of the first valve 91 and/or the second needle valve 922 of the second valve 92, and the battery pack 2 is evacuated through the first needle valve 912 and/or the second needle valve 922. In this way, after the first valve 91 and the second valve 92 are opened again, to be specific, after the first manual ball valve 911 of the first valve 91 and the second manual ball valve 921 of the second valve 92 are opened again, in the process of the temperature management device 1 performing temperature management on the battery pack 2, only the refrigerant circulates in the closed loop formed by the temperature management device 1 and the battery pack 2, avoiding the influence of other gases and improving the cooling effect of the refrigerant and system stability.

In this embodiment of this application, after the evacuation, the first valve 91 and the second valve 92 are opened, and before the temperature management device 1 is opened, the refrigerant may be added to the closed loop formed by the temperature management device 1 and the battery pack 2. Moreover, after the refrigerant is added, the temperature management device 1 may be turned on at any time. For example, the temperature management device 1 may be turned on at any time when the temperature of the battery pack 2 exceeds the test condition, allowing to cool the battery pack 2.

Optionally, the refrigerant in this embodiment of this application may be made of various materials. For example, the refrigerant may be a **134*a* refrigerant, which has a good cooling effect on the battery pack 2**, but the embodiments of this application are not limited thereto.

Optionally, the refrigerant in this embodiment of this application may be added at any position of the temperature management device 1. For example, the refrigerant is usually added at a low-pressure end or high-pressure end of the compressor 10, allowing the temperature management device 1 to be turned on at any time after the refrigerant is added. For example, the refrigerant may alternatively be added through the first needle valve 912 of the first valve and/or the second needle valve 922 of the second valve 92, and the embodiments of this application are not limited thereto.

It should be understood that as shown in FIGS. 2 and 3, the inlet 101 of the compressor 10 is connected to the refrigerant outlet 21 of the battery pack 2 in this embodiment of this application and may be configured to compress gas discharged from the refrigerant outlet 21 of the battery pack 2. Specifically, the refrigerant may cool the battery pack 2 in a way of vaporizing a liquid refrigerant to absorb heat, and the refrigerant outlet 21 of the battery pack 2 discharges vaporized gas of a high temperature. This vaporized gas enters through the inlet 101 of the compressor 10, where the compressor 10 increases the pressure of the gas. The compressed high-pressure gas is then discharged from the outlet 102 of the compressor 10 to the condenser 20.

Optionally, the type of the compressor 10 in this embodiment of this application may be flexibly selected depending on practical applications. For example, the compressor 10 may be a direct current variable frequency compressor and may be powered in a manner of alternating current (Alternating current, AC) to direct current (Direct current, DC) to enhance the working efficiency of the compressor 10, but the embodiments of this application are not limited thereto. Specifically, if the compressor 10 is a variable frequency compressor, the working frequency of the compressor 10 may be adjusted based on the temperature change of the battery pack 2. For example, during the test of the battery pack 2, the temperature of the battery pack 2 needs to be maintained at a preset temperature value. When the temperature of the battery pack 2 increases significantly as compared with the preset temperature value, the working frequency of the compressor 10 may be increased to rapidly reduce the temperature of the battery pack 2. Conversely, if the temperature of the battery pack 2 increases only slightly as compared with the preset temperature value, the working frequency of the compressor 10 may be appropriately reduced to avoid power waste of the compressor 10 and prevent resource waste and equipment failure caused by repeated activation and deactivation of the temperature management device 1.

In this embodiment of this application, as shown in FIGS. 2 and 3, the outlet 102 of the compressor 10 is connected to the inlet 201 of the condenser 20. The condenser 20 is configured to liquefy the high-temperature, high-pressure gas discharged from the outlet 102 of the compressor 10 to obtain a low-temperature liquid refrigerant.

Optionally, the type of the condenser 20 in this embodiment of this application may be flexibly selected depending on practical applications. For example, the condenser 20 may be a fin condenser to improve the heat dissipation efficiency of the condenser 20.

Optionally, as shown in FIGS. 2 and 3, the temperature management device 1 in this embodiment of this application further includes a fan 83 configured to cool the condenser 20, to further improve the efficiency of the condenser 20.

Optionally, as shown in FIGS. 2 and 3, the temperature management device 1 in this embodiment of this application further includes a liquid storage tank 81. The inlet 811 of the liquid storage tank 81 is connected to the outlet 202 of the condenser 20, and the outlet 812 of the liquid storage tank 81 is connected to the second port. For example, the outlet 812 of the liquid storage tank 81 may be connected to the first valve 91. The liquid storage tank 81 is configured to store the refrigerant discharged from the outlet 202 of the condenser 20. In this way, when the refrigerant discharged from the condenser 20 does not match the actual demand of the battery pack 2, especially when there is excessive refrigerant discharged from the condenser 20, the liquid storage tank 81 stores the refrigerant to prevent refrigerant waste.

Optionally, as shown in FIGS. 2 and 3, the temperature management device 1 in this embodiment of this application further includes a dry filter 82. The dry filter 82 is disposed between the outlet 202 of the condenser 20 and the first inlet 301 of the expansion valve 30. For example, the dry filter 82 may be located between the outlet 812 of the liquid storage tank 81 and the first inlet 301 of the expansion valve 30. For another example, the dry filter 82 may be located between the outlet 812 of the liquid storage tank 81 and the first valve 91. The dry filter 82 is configured to filter impurities in the refrigerant discharged from the outlet 812 of the liquid storage tank 81, so as to improve the cooling effect of the refrigerant entering the battery pack 2. For example, the refrigerant may contain impurities such as water.

Optionally, the monitoring device 50 in this embodiment of this application may include at least one of the following: a second sight glass 54 disposed between the dry filter 82 and the first inlet 301 of the expansion valve 30 and configured to monitor a state of a refrigerant entering the first inlet 301 of the expansion valve 30, for example, observing the amount of bubbles in the refrigerant or observing the amount of water in the refrigerant; a second temperature sensor 55 disposed between the dry filter 82 and the first inlet 301 of the expansion valve 30 and configured to monitor temperature of the refrigerant entering the first inlet 301 of the expansion valve 30; and a second pressure sensor 56 disposed between the dry filter 82 and the first inlet 301 of the expansion valve 30 and configured to monitor pressure of the refrigerant entering the first inlet 301 of the expansion valve 30.

For example, as shown in FIGS. 2 and 3, the second sight glass 54, the second temperature sensor 55, and the second pressure sensor 56 in this embodiment of this application may be located between the dry filter 82 and the first valve 91 to monitor the state of the refrigerant at respective positions. For another example, the relative positions between the second sight glass 54, the second temperature sensor 55, and the second pressure sensor 56 are not limited in this embodiment of this application. They may be arranged in the order shown in FIGS. 2 and 3 or in other orders.

Optionally, as shown in FIG. 2, the temperature management device 1 in this embodiment of this application may further include a control unit 70. The control unit 70 may be connected to the second temperature sensor 55 and the second pressure sensor 56 to timely obtain the temperature and pressure of the refrigerant discharged from the dry filter 82. The temperature and pressure may be recorded as data or used for adjusting another component within the temperature management device 1. For clarity, the control unit 70 shown in FIG. 2 is not illustrated in FIG. 3 of this embodiment of this application.

It should be understood that the control unit 70 of this embodiment of this application may be implemented in various ways. For example, the control unit 70 may be a controller, such as a programmable controller (Programmable Controller, PLC), to control a component connected thereto.

It should be understood that the refrigerant discharged from the condenser 20 in this embodiment of this application may enter the battery pack 2 through the expansion valve 30. Specifically, the expansion valve 30 in this embodiment of this application may include a first inlet 301 and a first outlet 302. The first outlet 302 may serve as the first port of the temperature management device 1 for connecting to the battery pack 2. Specifically, the expansion valve 30 may be configured to depressurize the liquid refrigerant discharged from the condenser 20. The depressurized refrigerant enters the battery pack 2 through the refrigerant inlet 22 of the battery pack 2. When the temperature of the battery pack 2 exceeds the originally preset temperature, for example, when the temperature of the battery pack 2 exceeds the required temperature for the test, the internal refrigerant of the battery pack 2 may be vaporized to cool the battery pack 2. The vaporized gas is then discharged from the refrigerant outlet 21 of the battery pack 2.

It should be understood that the refrigerant entering the expansion valve 30 is typically a low-temperature, high-pressure refrigerant. For example, the refrigerant is typically in a pressure range of 1500 kPa (kPa)±60 kPa. The expansion valve 30 may depressurize the refrigerant, and the depressurized refrigerant enters the vacuum battery pack 2 through the refrigerant inlet 22 of the battery pack 2, to cool the battery pack 2.

Furthermore, the expansion valve 30 may further be configured to adjust the amount of the refrigerant entering the battery pack 2. For example, when the temperature of the battery pack 2 increases significantly, in other words, when the temperature of the battery pack 2 is much higher than the preset temperature value, the expansion valve 30 may release a larger amount of refrigerants. Conversely, when the temperature increase of the battery pack 2 is small, a smaller amount of refrigerants is released.

Optionally, the type of the expansion valve 30 in this embodiment of this application may be flexibly selected depending on practical applications. For example, the expansion valve 30 may be an H-type thermal expansion valve. Specifically, for an H-type thermal expansion valve, the expansion valve 30 may further include a second inlet 303 and a second outlet 304. The second inlet 303 of the expansion valve 30 is connected to the first port 11, or the second inlet 303 of the expansion valve 30 may function as the first port 11. This allows gas discharged from the refrigerant outlet 21 of the battery pack 2 to be discharged through the second outlet 304 of the expansion valve 30. The expansion valve 30 is configured to adjust, based on the gas discharged from the refrigerant outlet 21 of the battery pack 2, the refrigerant discharged from the first outlet 302 of the expansion valve 30 to the battery pack 2. Specifically, the expansion valve 30 may determine, based on the state such as temperature or pressure of the refrigerant passing through the second inlet 303 and second outlet 304, whether the refrigerant is fully used in the battery pack 2. The expansion valve 30 may further include a temperature monitoring structure to sense or measure the temperature of the refrigerant passing through the battery pack 2.

For example, if the temperature increase of the battery pack 2 is small, refrigerant excess leads to insufficient utilization of the refrigerant in the battery pack 2, and as a result, the refrigerant passing through the second inlet 303 of the expansion valve 30 has a temperature higher than the preset temperature value or a pressure lower than the preset pressure value. In this case, the expansion valve 30 may reduce the refrigerant discharged from the first outlet 302 to the battery pack 2. Conversely, if there is insufficient refrigerant in the battery pack 2, the temperature of the battery pack 2 is high, and the temperature of the refrigerant passing through the second inlet 303 of the expansion valve 30 is also higher than the preset temperature value. In this case, the expansion valve 30 may increase the refrigerant discharged from the first outlet 302 to the battery pack 2.

Optionally, if the temperature of the refrigerant discharged from the battery pack 2 increases, for example, the preset temperature value for the discharged refrigerant is typically set to 0° C. to 5° C., the pressure of the refrigerant discharged from the battery pack 2 decreases. For example, the preset pressure value for the discharged refrigerant is typically set to 300 kPa±30 kPa or 300 kPa±20 kPa, but the embodiments of this application are not limited thereto.

It should be understood that the vaporized gas discharged from the refrigerant outlet 21 of the battery pack 2 of this embodiment of this application may carry some liquid. For example, incomplete vaporization of the refrigerant may result in discharge of a mixture of vaporized refrigerant and liquid. The embodiments of this application are not limited thereto.

Optionally, as shown in FIGS. 2 and 3, the monitoring device 50 further includes a third temperature sensor 57 connected to the battery pack 2. The third temperature sensor 57 is configured to monitor the internal temperature of the battery pack 2. For example, when the temperature measured by the third temperature sensor 57 exceeds the required test temperature or the normal temperature of the battery pack 2, the temperature management device 1 is controlled to be turned on. Conversely, when the measured temperature meets the test requirement or the normal temperature of the battery pack 2, the temperature management device is controlled to be turned off. Specifically, the third temperature sensor 57 may be connected to the control unit 70, enabling the control unit 70 to obtain the internal temperature of the battery pack 2. This temperature value may be recorded as experimental data and used for adjusting the temperature management device 1.

In this embodiment of this application, the gas discharged from the battery pack 2 may either directly enter the compressor 10 or pass through the pressure regulating valve 40 to enter the compressor 10. Specifically, the first end 401 of the pressure regulating valve 40 in this embodiment of this application is connected to the refrigerant outlet 21 of the battery pack 2. For example, the first end 401 of the pressure regulating valve 40 may be connected to the second valve 92. The second end 402 of the pressure regulating valve 40 is connected to the inlet 101 of the compressor 10. The pressure regulating valve 40 may be configured to regulate the pressure value of the gas discharged from the second end 402 of the pressure regulating valve 40 to the inlet 101 of the compressor 10 to be within a preset range.

Optionally, the preset range in this embodiment of this application may be set depending on practical applications. For example, it may be set depending on the working efficiency of the compressor 10. For example, as described earlier, the preset pressure value for the refrigerant discharged from the battery pack 2 in this embodiment of this application is typically 300 kPa±30 kPa. Correspondingly, the preset range may be set to 300±30 kPa to ensure the working efficiency of the compressor 10 and reduce power consumption.

Optionally, the monitoring device 50 in this embodiment of this application further includes at least one of the following: a first sight glass 51 disposed between the inlet 101 of the compressor 10 and the pressure regulating valve 40 and configured to monitor liquid mixed in gas entering the inlet 101 of the compressor 10; a first temperature sensor 52 disposed between the pressure regulating valve 40 and the first port 11 and configured to monitor temperature of a refrigerant entering the pressure regulating valve 40; and a first pressure sensor 53 disposed between the pressure regulating valve 40 and the first port 11 and configured to monitor pressure of the refrigerant entering the pressure regulating valve 40.

For example, as shown in FIGS. 2 and 3, the first sight glass 51 in this embodiment of this application is typically disposed between the compressor 10 and the pressure regulating valve 40 to monitor the state of a liquid mixed in the gas entering the compressor 10. For example, it may be configured to observe the state of a liquid refrigerant mixed in the gas entering the compressor 10. In this way, the liquid refrigerant mixed in the gas entering the compressor 10 can be reduced in a timely manner when excessive liquid refrigerant mixed in the gas enters the compressor 10. This avoids that the excess low-temperature refrigerant enters the compressor 10, causing too much ice at the low-pressure end of the compressor 10 and avoiding a liquid impact accident with the compressor 10. The first temperature sensor 52 and the first pressure sensor 53 of this embodiment of this application may be disposed between the pressure regulating valve 40 and the second valve 92 to monitor the temperature and pressure of the refrigerant entering the pressure regulating valve 40. In addition, the relative order of the first temperature sensor 52 and the first pressure sensor 53 is not limited in this embodiment of this application. For example, the first temperature sensor 52 and the first pressure sensor 53 may be arranged in an order shown in FIGS. 2 and 3 or in other orders.

In some embodiments, the control unit 70 of this embodiment of this application may be connected to the first temperature sensor 52 and the first pressure sensor 53 to obtain the temperature and pressure of the refrigerant discharged from the battery pack 2 in a timely manner. The obtained temperature and pressure of the refrigerant discharged from the battery pack 2 may be recorded as data or used for adjusting another component within the temperature management device 1. For example, when the refrigerant discharged by the battery pack 2 has a pressure value lower than a preset pressure value, it is determined that there is excessive refrigerant inside the battery pack 2, and therefore, the refrigerant entering the battery pack 2 is reduced.

It should be understood that the second end 402 of the pressure regulating valve 40 in this embodiment of this application may be configured to input gas whose pressure value is within the preset range to the inlet 101 of the compressor 10. However, the pressure value of the refrigerant at the first end 401 of the pressure regulating valve 40 may not fall within this preset range. Therefore, the temperature management device 1 needs to be adjusted. Specifically, various reasons may lead to the pressure of the refrigerant at the first end 401 of the pressure regulating valve 40 being lower than the preset range. For example, the temperature of the refrigerant discharged from the condenser 20 being too low may lead to a too low pressure value of the refrigerant at the first end 401 of the pressure regulating valve 40. For another example, the pressure value of the gas at the first end 401 of the pressure regulating valve 40 may alternatively be caused by the pressure value of the gas at the high-pressure end of the compressor 10 being low, that is, the pressure value of the gas discharged from the outlet 102 of the compressor 10 to the condenser 20 being low. For another example, the temperature of the battery pack 2 being too low may also lead to a too low pressure value of the refrigerant at the first end 401 of the pressure regulating valve 40. Moreover, the foregoing reasons may be present alone or together.

If the temperature of the refrigerant entering the compressor 10 is too low, consequently, the temperature of the low-pressure end of the compressor 10 may be too low, causing too much ice. Alternatively, this may lead to a liquid impact accident in the compressor 10, causing a failure to the compressor 10 or damaging the compressor 10. Therefore, the pressure regulating valve 40 may be disposed to prevent the temperature of the refrigerant temperature entering the compressor 10 from being too low.

For the above reasons, various manners may be employed to adjust the pressure of the refrigerant at the first end 401 of the pressure regulating valve 40. For example, the temperature management device 1 in this embodiment of this application may further include an adjustment assembly 60. The adjustment assembly 60 is configured to connects the inlet 101 of the compressor 10 and the outlet 202 of the condenser 20. The adjustment assembly 60 is configured to adjust the proportion of the refrigerant entering the first inlet 301 of the expansion valve 30 to the refrigerant discharged from the outlet 202 of the condenser 20. The pressure regulating valve 40 in the embodiments of this application is configured to provide gas with a relatively stable pressure value to the compressor 10. Therefore, when the pressure of the refrigerant discharged from the battery pack 2 does not fall within the preset range, adjustment may be made through the adjustment assembly 60.

For example, the pressure regulating valve 40 of this embodiment of this application may be connected to the control unit 70. The adjustment assembly 60 may also be connected to the control unit 70. The control unit 70 is configured to control the adjustment assembly 60 based on the pressure of the gas at the first end 401 of the pressure regulating valve 40, to facilitate timely adjustment of the temperature management device 1, thereby improving the cooling efficiency and avoiding waste.

Specifically, the adjustment assembly 60 of this embodiment of this application may be configured to increase the proportion of the refrigerant entering the first inlet 301 of the expansion valve 30 to the refrigerant discharged through the outlet 202 of the condenser 20 if pressure of gas at the first end 401 of the pressure regulating valve 40 is higher than the preset range. Specifically, if the pressure of the gas entering the first end 401 of the pressure regulating valve 40 is higher than the preset range, or if the temperature of the gas entering the first end 401 of the pressure regulating valve 40 is higher than the preset temperature value, the refrigerant in the battery pack 2 may be insufficient. Therefore, the refrigerant entering the first inlet 301 of the expansion valve 30 may be increased by using the adjustment assembly 60, to increase the refrigerant in the battery pack 2, thereby implementing rapid temperature drop and reducing the pressure of the gas at the first end 401 of the pressure regulating valve 40.

The adjustment assembly 60 of this embodiment of this application may be further configured to decrease the proportion of the refrigerant entering the first inlet 301 of the expansion valve 30 to the refrigerant discharged through the outlet 202 of the condenser 20 if pressure of gas at the first end 401 of the pressure regulating valve 40 is lower than the preset range. Specifically, if the pressure of the gas entering the first end 401 of the pressure regulating valve 40 is lower than the preset range, or if the temperature of the gas entering the first end 401 of the pressure regulating valve 40 is lower than the preset temperature value, the refrigerant in the battery pack 2 may be excessive or the temperature of the refrigerant in the battery pack 2 may be too low. Therefore, the refrigerant entering the first inlet 301 of the expansion valve 30 may be reduced by using the adjustment assembly 60, to reduce the refrigerant in the battery pack 2, thereby avoiding refrigerant waste.

Optionally, if the pressure of the gas at the first end 401 of the pressure regulating valve 40 is lower than the preset range, the adjustment assembly 60 is configured to control at least some of the refrigerant discharged from the outlet 202 of the condenser 20 to flow to the inlet 101 of the compressor 10. This can reduce the refrigerant discharged by the condenser 20 entering the expansion valve 30, thereby reducing the refrigerant entering the battery pack 2 and avoiding waste.

It should be understood that the adjustment assembly 60 of this embodiment of this application may be configured depending on practical applications. For example, as shown in FIGS. 2 and 3, the adjustment assembly 60 may include a capillary tube 61 and an electromagnetic valve 62. An inlet 621 of the electromagnetic valve 62 is connected to the outlet 202 of the condenser 20, and an outlet 622 of the electromagnetic valve 62 is connected to the inlet 101 of the compressor 10 via the capillary tube 61. This configuration is not only convenient for adjustment but also relatively simple in terms of wiring. Additionally, the electromagnetic valve 62 of this embodiment of this application may have two states: open and closed. Furthermore, the amount of the refrigerant flowing from the electromagnetic valve 62 to the capillary tube 61 may be adjusted by controlling the duration or frequency of the electromagnetic valve 62 being open.

When the refrigerant entering the expansion valve 30 or the battery pack 2 needs to be increased, in other words, when the proportion of the refrigerant entering the first inlet 301 of the expansion valve 30 to the refrigerant passing through the outlet 202 of the condenser 20 needs to be increased, the electromagnetic valve 62 is closed, or the duration or frequency of the electromagnetic valve 62 being open is reduced. This allows a large amount of refrigerant discharged from the condenser 20 to enter the expansion valve 30, that is, enter the battery pack 2, and relatively a small amount of refrigerant or no refrigerant enters the compressor 10 through the capillary tube 61. Conversely, when the refrigerant entering the expansion valve 30 or the battery pack 2 needs to be reduced, in other words, when the proportion of the refrigerant entering the first inlet 301 of the expansion valve 30 to the refrigerant passing through the outlet 202 of the condenser 20 needs to be reduced, the electromagnetic valve 62 is opened, or the duration or frequency of the electromagnetic valve 62 being open is increased. This allows some of the refrigerant discharged from the condenser 20 to enter the expansion valve 30, that is, enter the battery pack 2, and some of the refrigerant directly enters the compressor 10 through the capillary tube 61, to reduce the proportion of the refrigerant entering the first inlet 301 of the expansion valve 30 to the refrigerant passing through the outlet 202 of the condenser 20, thereby increasing the pressure of the refrigerant at the first end 401 of the pressure regulating valve 40.

Optionally, different types of electromagnetic valves 62 may be selected in the embodiments of this application depending on practical applications. For example, the electromagnetic valve 62 may be a liquid electromagnetic valve.

It should be understood that under a condition that the pressure of the refrigerant at the first end 401 of the pressure regulating valve 40 of this embodiment of this application is lower than the preset range, the pressure of the refrigerant at the first end 401 of the regulating valve 40 may be increased through other manner than the adjustment manner based on the adjustment assembly 60. Alternatively, the pressure of the refrigerant at the first end 401 of the regulating valve 40 may be increased through another manner together with the adjustment manner based on the adjustment assembly 60.

For example, the amount of the refrigerant entering the battery pack 2 may be controlled through the expansion valve 30. For another example, the adjustment may be made through the compressor 10, where the compressor 10 is a variable frequency compressor 10. Specifically, if the pressure of the refrigerant at the first end 401 of the pressure regulating valve 40 is lower than the preset range, or if in the case that the electromagnetic valve 62 is fully opened, the pressure of the refrigerant at the first end 401 of the pressure regulating valve 40 is still lower than the preset range, the working frequency of the compressor 10 may be reduced to decrease the gas displacement of the compressor 10, in other words, reduce the compression rate of the refrigerant inside the compressor 10, thereby increasing the pressure of the refrigerant at the first end 401 of the pressure regulating valve 40. Conversely, the pressure of the refrigerant at the first end 401 of the pressure regulating valve 40 may be reduced by increasing the working frequency of the compressor 10, for example, increasing the gas displacement of the compressor 10, in other words, increasing the compression rate of the refrigerant inside the compressor 10.

Therefore, in the temperature management device 1 of this embodiment of this application, the pressure regulating valve 40, the adjustment assembly 60, and the monitoring device 50 are disposed. This can not only detect changes in the temperature and pressure of the refrigerant at various locations within the temperature management device 1 in real-time but also effectively adjust the amount of the refrigerant inside the battery pack 2. This can not only ensure the temperature required by the battery pack 2 to implement rapid cooling, but also effectively avoid resource waste, thereby improving the working efficiency of the temperature management device 1.

Although this application has been described with reference to some preferred embodiments, various modifications to this application and replacements of the components therein with equivalents may be made without departing from the scope of this application. In particular, as long as there is no structural conflict, the various technical features mentioned in the embodiments can be combined in any manner. This application is not limited to the specific embodiments disclosed in this specification but includes all technical solutions falling in the scope of the claims.

What is claimed is:

1. A temperature management device used to perform temperature management on a battery pack cooled by a refrigerant, wherein the temperature management device comprises:

a first port configured to detachably connect to a refrigerant outlet of the battery pack;

a second port configured to detachably connect to a refrigerant inlet of the battery pack;

a compressor having an inlet and an outlet;

a condenser having an inlet and an outlet, wherein the inlet of the condenser is connected to the outlet of the compressor;

a first valve and a second valve, wherein the first valve is connected to the outlet of the condenser and the second port, and the second valve is connected to the first port and the inlet of the compressor;

a pressure regulating valve, wherein a first end of the pressure regulating valve is connected to the first port, a second end of the pressure regulating valve is connected to an inlet of the compressor, and the pressure regulating valve is configured to regulate pressure of gas discharged from the refrigerant outlet of the battery pack so that a pressure value of gas discharged from the second end of the pressure regulating valve to the inlet of the compressor is within a preset range;

an expansion valve, wherein the expansion valve is an H-type thermal expansion valve comprising a first inlet, a first outlet, a second inlet, and a second outlet, the first inlet is connected to the outlet of the condenser through the first valve, the first outlet is connected to the second port, the second inlet is connected to the first port, the second outlet is connected to the first end of the pressure regulating valve through the second valve, the expansion valve is configured to:

allow gas discharged from the refrigerant outlet of the battery pack to be discharged through the second outlet of the expansion valve; and adjust, based on the gas discharged from the refrigerant outlet of the battery pack, a refrigerant discharged from the first outlet of the expansion valve;

a monitoring device, wherein the monitoring device is connected to the first port and the second port and configured to monitor a state of the refrigerant at the first port and the second port, and the monitoring device comprises at least one sight glass, at least one temperature sensor, and at least one pressure sensor, the at least one pressure sensor comprises a first pressure sensor disposed between the pressure regulating valve and the first port and configured to monitor pressure of the refrigerant entering the pressure regulating valve; and an adjustment assembly comprising a capillary tube and an electromagnetic valve, wherein an inlet of the electromagnetic valve is connected to the outlet of the condenser and the first valve, and an outlet of the electromagnetic valve is connected to the inlet of the compressor via the capillary tube and connected to the second end of the pressure regulating valve, the adjustment assembly is configured to:

increase a proportion of the refrigerant entering the first inlet of the expansion valve to the refrigerant discharged through the outlet of the condenser if pressure of the gas at the first end of the pressure regulating valve is higher than the preset range; and decrease the proportion of the refrigerant entering the first inlet of the expansion valve to the refrigerant discharged through the outlet of the condenser if pressure of the gas at the first end of the pressure regulating valve is lower than the preset range.

2. The temperature management device according to claim 1, wherein the preset range is 300±30 kPa.

3. The temperature management device according to claim 1, wherein the adjustment assembly is configured to control at least some of the refrigerant discharged through the outlet of the condenser to flow to the inlet of the compressor if the pressure of the gas at the first end of the pressure regulating valve is lower than the preset range.

4. The temperature management device according to claim 1, wherein the temperature management device further comprises:

a control unit, wherein the control unit is configured to control the adjustment assembly based on the pressure of the gas at the first end of the pressure regulating valve.

5. The temperature management device according to claim 1, wherein the temperature management device further comprises:

a fan configured to cool the condenser.

6. The temperature management device according to claim 1, the monitoring device further comprises:

wherein the at least one temperature sensor comprises a third temperature sensor connected to the battery pack, wherein the third temperature sensor is configured to monitor internal temperature of the battery pack.

7. The temperature management device according to claim 1, wherein when the first valve and the second valve are closed, the battery pack is used to replace another battery pack and connected to the temperature management device, so that when the first valve and the second valve are opened again, the temperature management device performs temperature management on the battery pack.

8. The temperature management device according to claim 7, wherein the temperature management device further comprises:

a vacuum assembly, wherein the vacuum assembly is configured to evacuate the battery pack after the battery pack is connected to the temperature management device and before the first valve and the second valve are opened again.

9. A test system, comprising:

the temperature management device according to claim 1; and a plurality of battery packs;

wherein the temperature management device is configured to separately perform, at different times, temperature management for the plurality of battery packs cooled by a refrigerant, so as to test the plurality of battery packs.

10. The temperature management device according to claim 1, wherein the at least one temperature sensor comprises a first temperature sensor disposed between the pressure regulating valve and the first port and configured to monitor temperature of a refrigerant entering the pressure regulating valve.

11. The temperature management device according to claim 1, wherein the first valve comprises a first manual ball valve and/or a first needle valve, and the second valve comprises a second manual ball valve and/or a second needle valve.

12. The temperature management device according to claim 11, wherein, after the first manual ball valve and the second manual ball valve are closed and before the battery pack is dismounted and replaced with another battery pack, the first needle valve and/or the second needle valve is configured to connect to a refrigerant recycling machine to recycle remaining refrigerant inside the battery pack.

13. The temperature management device according to claim 11, wherein the compressor is a direct current variable frequency compressor configured to be powered in a manner of alternating current to direct current, and a working frequency of the compressor is adjustable based on a temperature change of the battery pack.

14. The temperature management device according to claim 1, wherein the electromagnetic valve has an open state and a closed state, and an amount of the refrigerant flowing from the electromagnetic valve to the capillary tube is adjusted by controlling a duration or frequency of the electromagnetic valve being at the open state.

15. The temperature management device according to claim 14, wherein the electromagnetic valve is configured to be at the closed state or to reduce a duration or frequency of at the open state to increase the proportion of the refrigerant entering the first inlet of the expansion valve and to reduce the proportion of the refrigerant entering the inlet of the compressor through the capillary tube.

16. The temperature management device according to claim 14, wherein the electromagnetic valve is configured to be at the open state or to increase a duration or frequency of at the open state to decrease the proportion of the refrigerant entering the first inlet of the expansion valve and to increase the proportion of the refrigerant entering the inlet of the compressor through the capillary tube, thereby increasing the pressure of the refrigerant at the first end of the pressure regulating valve.

17. The temperature management device according to claim 6, wherein the third temperature sensor is connected to a control unit, and the control unit is configured to obtain an internal temperature of the battery pack based on the third temperature sensor.

18. The temperature management device according to claim 6, wherein the temperature management device is configured to be turned on when a temperature measured by the third temperature sensor exceeds a required test temperature or a normal temperature of the battery pack, and configured to be turned off when the measured temperature meets the required test temperature or the normal temperature of the battery pack.

19. The temperature management device according to claim 1, further comprising:

a liquid storage tank, wherein an inlet of the liquid storage tank is connected to the outlet of the condenser, and the liquid storage tank is configured to store a refrigerant discharged from the outlet of the condenser.

20. The temperature management device according to claim 19, further comprising:

a dry filter, wherein the dry filter is disposed between an outlet of the liquid storage tank and the first inlet of the expansion valve and configured to filter impurities in a refrigerant discharged from the outlet of the liquid storage tank.

21. The temperature management device according to claim 20, wherein the at least one temperature sensor comprises a second temperature sensor disposed between the dry filter and the first inlet of the expansion valve and configured to monitor temperature of the refrigerant entering the first inlet of the expansion valve; and the at least one pressure sensor comprises a second pressure sensor disposed between the dry filter and the first inlet of the expansion valve and configured to monitor pressure of the refrigerant entering the first inlet of the expansion valve.

22. The temperature management device according to claim 20, wherein the at least one sight glass comprises a first sight glass and a second sight glass, the first sight glass is disposed between the inlet of the compressor and the pressure regulating valve and configured to monitor liquid mixed in gas entering the inlet of the compressor, the second sight glass is disposed between the dry filter and the first inlet of the expansion valve and configured to monitor a state of a refrigerant entering the first inlet of the expansion valve and to observe an amount of bubbles in the refrigerant and an amount of water in the refrigerant.

* * * * *